July 1, 1958     H. A. WINTERMUTE     2,841,240
APPARATUS FOR SEPARATING MATERIAL FROM GASES
Filed Nov. 3, 1955     2 Sheets-Sheet 2
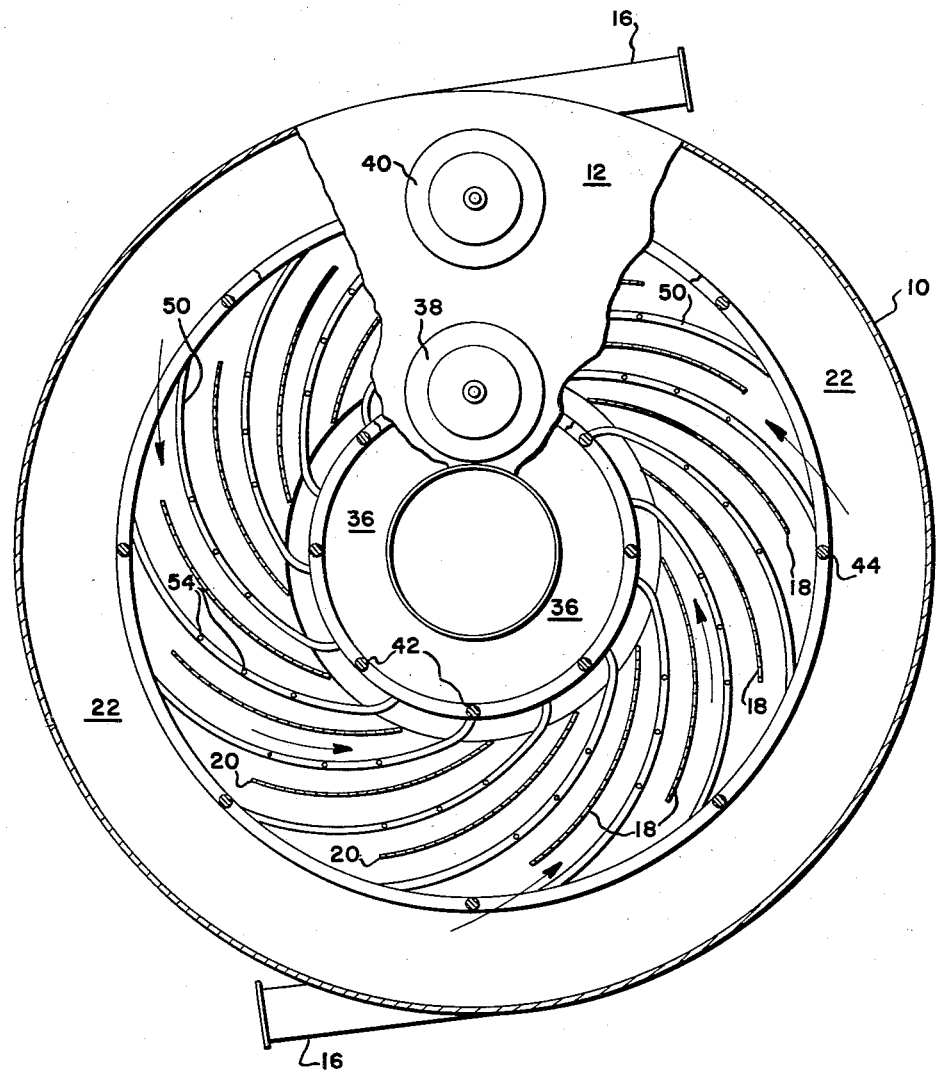
INVENTOR
HARRY A. WINTERMUTE

# United States Patent Office 2,841,240
Patented July 1, 1958

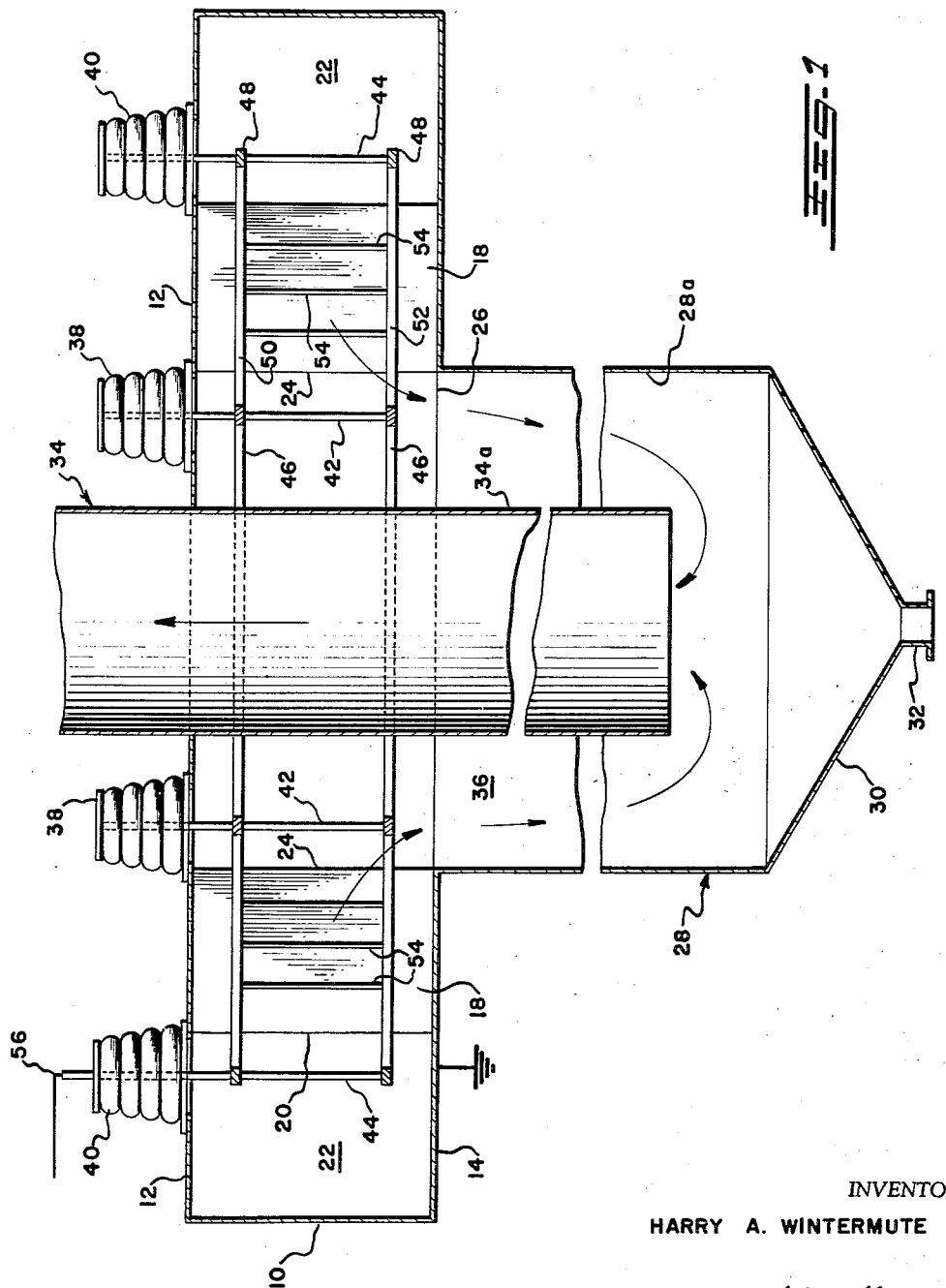

2,841,240

APPARATUS FOR SEPARATING MATERIAL FROM GASES

Harry A. Wintermute, Plainfield, N. J., assignor to Research Corporation, New York, N. Y., a corporation of New York Application November 3, 1955, Serial No. 544,636

1 Claim. (Cl. 183—7)

This invention relates to apparatus for the separation of suspended particulate material from gases and in particular to improved apparatus whereby the separation is effected by the combined action of electrical and centrifugal operations.

An object of the present invention is to provide an apparatus wherein the suspended particulate materials in the gas stream are first subjected to an electrostatic agglomerating operation and then the agglomerated particulate material is centrifugally separated from the gas stream.

A further object is to provide such a device wherein the agglomerating operation is performed in a plurality of curved zones and the separation of the agglomerated particles from the gas streams is accomplished in a single zone.

A further object of the present invention is to provide such a device wherein the gas is given its initial whirling motion in the agglomerating zone.

A further object of this invention is to provide such a device wherein both the agglomerating operation and the gas separation operation are carried out in separate annular zones. A further object is to provide such an apparatus wherein efficient cyclonic action is provided by the division of the gas stream into a plurality of streams evenly spaced about the separating chamber.

A further object is to provide such a device where the vane means establishing the cyclonic action in the gas stream form extended surface electrode means.

A further object is to provide such a device wherein the curvature of the vanes establishing the cyclonic action are uniformly spaced throughout the entire electrostatic treating zone.

These and other objects and advantages are provided by the apparatus for separating suspended materials from gases which generally comprises a first vertically extending cylindrical shell having a gas inlet opening therein, a top cover means and a bottom cover means for the cylindrical shell, a plurality of inwardly curved vane members spaced from the cylindrical wall of the shell and extending between the top and bottom cover means to form an annular gas treating chamber, a separator tube having a hopper bottom depending from the bottom cover means below the inner boundary of the annular gas treating chamber and communicating therewith, a gas outlet tube extending through the top cover means and concentrically into the separator tube, the outer wall of the discharge tube being spaced inwardly of the inner wall of the separator tube to provide a second annular gas treating zone therebetween, a plurality of vertically disposed discharge electrodes centrally positioned between the opposed faces of the inwardly curved vane members, and particulate material outlet means in the hopper bottom.

The invention will be more particularly described with reference to the illustrative embodiments of the present invention wherein:

Fig. 1 is a vertical section through a gas treating apparatus constructed in accordance with the teachings of the present invention; and Fig. 2 is a top plane view of the device shown in Fig. 1 with a portion of the top cover broken away to show the novel structures of the gas separating apparatus.

Referring to the drawings 10 is a vertical cylindrical wall having a top cover plate 12 and a bottom cover plate 14. One or more tangential gas inlet conduits 16 are provided in the vertically extending cylindrical wall 10 as more clearly shown in Fig. 2 of the illustrated embodiments of the invention.

A plurality of curved vane members 18 are secured along their top and bottom edges to the top cover plate 12 and the bottom cover plate 14 respectively. The outer edges 20 of the vane members 18 are spaced from the inner vertical surface of wall 10 to define therebetween a plenum chamber 22, while the other edges 24 extend inwardly of the wall 10 to provide a ring of inwardly curved gas passages. From Fig. 2 of the drawings, it will be seen that in the preferred form of the present invention the curvature of each of the vanes 18 is such that the space between opposed faces of adjacent vanes is uniform throughout.

The bottom cover 14 is provided with an opening 26 concentric with the vertical cylindrical wall 10. The circumference of the opening 26 being substantially equal to the circumference of the inner edge of the annular gas treating zone defined by the plurality of inwardly curved baffle members 18.

A depending cylindrical separator tube 28 having a hopper bottom 30 provided with a particulate material outlet means 32 is secured to the bottom cover 14 about the circumferential edge of the opening 26.

A clean gas outlet tube 34 extends concentrically through the top cover 12 and projects downwardly into the separator tube 28. The outer wall 34a of discharge tube 34 is spaced inwardly of the inner wall 28a of the discharge tube 28 to define therebetween an annular gas treating zone 36. As shown in Fig. 1 of the drawings the discharge tube 34 terminates above the hopper bottom 30 of the separator tube 28 as is well known in the art.

The cover plate 12 supports an inner and outer ring of insulators 38 and 40 respectively. The radius of the inner ring of the insulators 38 is slightly less than the minor radius of the annular gas treating zone defined by vanes 18, while the radius of the ring formed by insulators 40 is slightly larger than the major radius of the annular zone formed by said vanes. Each of the insualtors 38 and 40 supports a depending conductive rod 42 and 44 respectively.

Each conductive rod 42 rigidly supports in vertically spaced relationship a pair of conductive rings 46, while each conductive rod 44 rigidly supports a similar pair of vertically spaced conductive rings 48.

An inwardly curved upper electrode support member 50 is secured between the upper conductive rings 46 and 48 between the spaces defined by the opposed walls of adjacent baffle vane members 18. A corresponding lower electrode support 52 is supported between the lower conductive rings 46 and 48 vertically below the corresponding upper support 50. Suspended between each pair of upper and lower electrode supports 50 and 52 is a plurality of discharge electrodes 54.

A high tension electrostatic field is maintained within each of the gas passages defined by the inwardly curved vane members 18 by energizing the discharge electrodes 54 with high voltage electricity conducted to the electrodes through one or more of the conductive rods 44 as shown at 56, while the vane members 18 are grounded through the shell of the separator.

In operation of the combined electrostatic and mechanical gas cleaning device of the present invention gas containing suspended particulate material is directed into the plenum chamber 22 through the one or more gas inlets 16. The gas within plenum chamber 22 enters the plurality of ducts having curved surfaces defined by the walls of the vanes 18 where it receives electrostatic treatment. The velocity of the gas through the curved passages is maintained sufficiently high to prevent collection by precipitation action on the surfaces of the vanes 18 thereby preventing objectionable back corona discharges therein. In addition to agglomeration of the smaller particles of the suspended material within the plurality of ducts defined by the vanes 18 the curvature of the vanes establishes a cyclonic action to the gas stream. Thus upon leaving the ducts the gas and agglomerates enter the separation chamber 36 where the agglomerates are centrifugally removed from the major portion of the gas stream which turns and flows upwardly through the discharge tube 34, as shown by the directional arrows in Fig. 1 of the drawings.

It is apparent that the vanes 18 may terminate at their inner ends at substantially any degree of angularity from 0 to 90°, however, as more accurately shown in Fig. 2 of the drawings, it is desirable that the vanes terminate slightly off the tangential zero degrees angularity whereby the gas starts spinning slightly out and away from the vane ends to provide more effective removal of the agglomerated particles.

From the foregoing description it will be seen that the novel electrostatic centrifugal gas cleaning apparatus fully accomplishes the aims and objects of the present invention. It will further be understood that the foregoing description is directed only to a preferred embodiment of the present invention and that various modifications may be made in the form of construction. For example, it is contemplated that due to the back pressure created by the cyclonic action of the gases that more than one unit such as shown in the application drawings may be operated within a single housing having a common gas feed.

I claim:

Apparatus for separating suspended particles from gases comprising a vertically extending cylindrical shell having a gas inlet opening in the periphery thereof, a top cover means and a bottom cover means for said shell, a plurality of vane members spaced from and curved spirally inwardly away from the wall of said cylindrical shell defining a plurality of spiral gas passages communicating with said inlet opening, said vane members extending between the top and bottom cover means to form an annular gas treating chamber, a separator tube having a hopper bottom depending from the bottom cover means below the inner boundary of the annular gas treating chamber and communicating therewith, a gas outlet tube extending through the top cover means and concentrically into the separator tube, the outer wall of said outlet tube being spaced inwardly of the inner wall of the separator tube to provide a second annular gas treating zone therebetween, a plurality of vertically disposed discharge electrodes positioned between the opposed faces of said vane members, particulate material outlet means in said hopper bottom, and conductor means connecting said discharge electrodes and said vane members to a source of high potential to thereby create an electric field between associated groups of said electrodes and said vane members to agglomerate the suspended particles in the transient gas prior to their entry into the second treating zone.

References Cited in the file of this patent
UNITED STATES PATENTS

| | | |
|---|---|---|
| 431,951 | Martin | July 8, 1890 |
| 1,843,839 | Ruder | Feb. 2, 1932 |
| 1,846,365 | Seipp | Feb. 23, 1932 |
| 2,360,595 | Thomson | Oct. 17, 1944 |